(12) United States Patent
Hata et al.

(10) Patent No.: US 9,607,406 B2
(45) Date of Patent: Mar. 28, 2017

(54) SIZE MEASUREMENT DEVICE AND SIZE MEASUREMENT METHOD

(71) Applicant: PANASONIC INTELLECTUAL PROPERTY MANAGEMENT CO., LTD., Osaka (JP)

(72) Inventors: Ryouta Hata, Fukuoka (JP); Takahiro Shoji, Fukuoka (JP); Yuuji Toyomura, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 140 days.

(21) Appl. No.: 14/585,627

(22) Filed: Dec. 30, 2014

(65) Prior Publication Data
US 2015/0187091 A1 Jul. 2, 2015

Related U.S. Application Data

(63) Continuation-in-part of application No. PCT/JP2013/003819, filed on Jun. 19, 2013.

(30) Foreign Application Priority Data

Jul. 2, 2012 (JP) .................................. 2012-148406

(51) Int. Cl.
*G06K 9/00* (2006.01)
*G06T 7/60* (2017.01)
(Continued)

(52) U.S. Cl.
CPC .............. *G06T 7/602* (2013.01); *G01B 11/02* (2013.01); *G01C 3/14* (2013.01); *G06T 7/0042* (2013.01);
(Continued)

(58) Field of Classification Search
None
See application file for complete search history.

(56) References Cited

U.S. PATENT DOCUMENTS 5,504,847 A * 4/1996 Kimura .................. G06T 17/20
345/420
6,092,059 A * 7/2000 Straforini ............. G06K 9/6292
706/10
(Continued)

FOREIGN PATENT DOCUMENTS

JP 2001-082954 3/2001
JP 2002-222423 8/2002
(Continued)

OTHER PUBLICATIONS

International Search Report (ISR) in International Patent Application No. PCT/JP2013/003819, dated Jul. 30, 2013.

*Primary Examiner* — Shefali Goradia
(74) *Attorney, Agent, or Firm* — Greenblum & Bernstein, P.L.C.

(57) ABSTRACT

A size measurement device for measuring a size of an object from a captured image of the object includes: an imaging unit that captures an image of an object; a display unit that displays image data captured by the imaging unit; an input unit for inputting instructions of a user; a region setting unit that, when positions are designated with the input unit in the image data displayed on the display unit, sets surrounding regions including therein respective designated positions; and a feature point determination unit that determines, in the surrounding regions set by the region setting unit, feature points providing coordinates of the object to be measured.

12 Claims, 12 Drawing Sheets

(51) Int. Cl.
*G01B 11/02* (2006.01)
*H04N 13/02* (2006.01)
*G01C 3/14* (2006.01)
*G06T 7/00* (2017.01)
*H04N 13/00* (2006.01)

(52) U.S. Cl.
CPC .......... *G06T 7/0046* (2013.01); *G06T 7/0085* (2013.01); *H04N 13/0239* (2013.01); *G06T 2207/10004* (2013.01); *G06T 2207/10012* (2013.01); *G06T 2207/20101* (2013.01); *G06T 2207/20104* (2013.01); *H04N 2013/0081* (2013.01)

(56) References Cited

U.S. PATENT DOCUMENTS

| | | | |
|---|---|---|---|
| 6,192,145 B1 * | 2/2001 | Anandan | G06K 9/209 348/E13.008 |
| 6,409,383 B1 * | 6/2002 | Wang | A61B 6/583 378/204 |
| 8,284,988 B2 * | 10/2012 | Sones | G01B 11/024 235/440 |
| 8,547,448 B2 | 10/2013 | Shikatani et al. | |
| 2007/0237356 A1 * | 10/2007 | Dwinell | B07C 3/14 382/101 |
| 2009/0015658 A1 * | 1/2009 | Enstad | H04N 5/232 348/14.08 |
| 2009/0316022 A1 | 12/2009 | Hatano | |
| 2010/0290665 A1 | 11/2010 | Sones et al. | |
| 2011/0115730 A1 | 5/2011 | Kim et al. | |
| 2012/0069223 A1 | 3/2012 | Yamahata et al. | |
| 2013/0114883 A1 | 5/2013 | Angot et al. | |
| 2014/0021259 A1 * | 1/2014 | Moed | G06K 9/2027 235/472.01 |
| 2015/0016684 A1 | 1/2015 | Matsumoto et al. | |

FOREIGN PATENT DOCUMENTS

| | | |
|---|---|---|
| JP | 2004-219255 | 8/2004 |
| JP | 2010-008352 | 1/2010 |

* cited by examiner

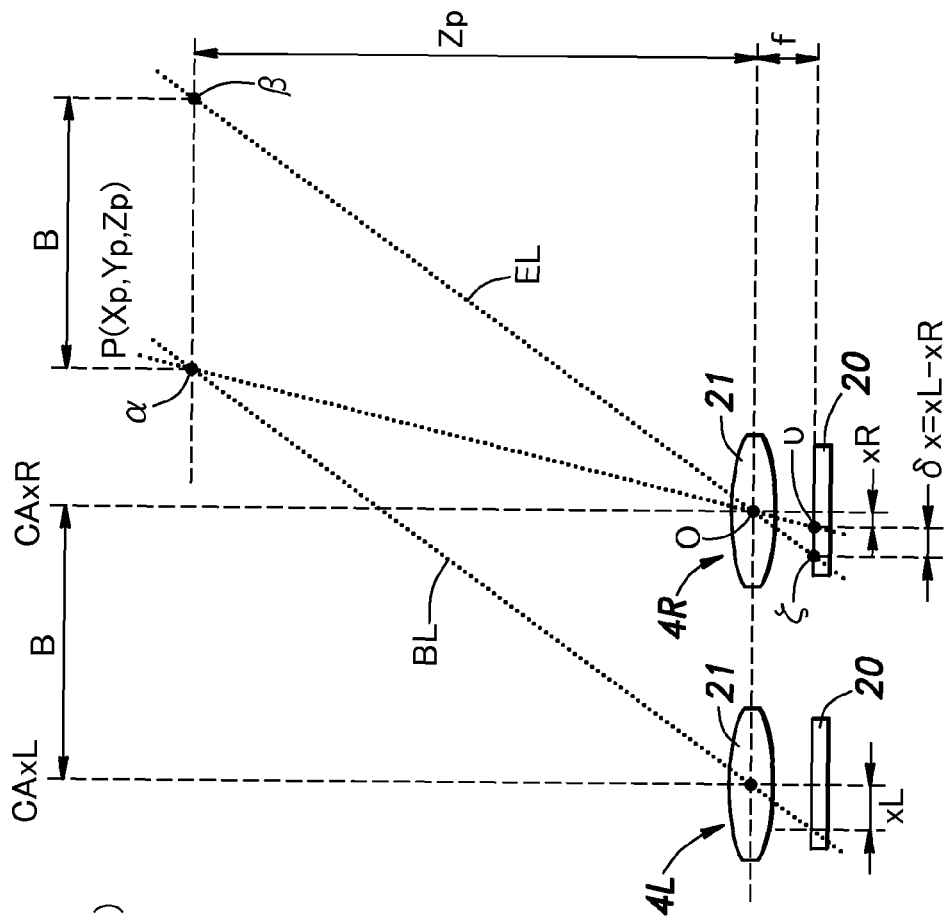
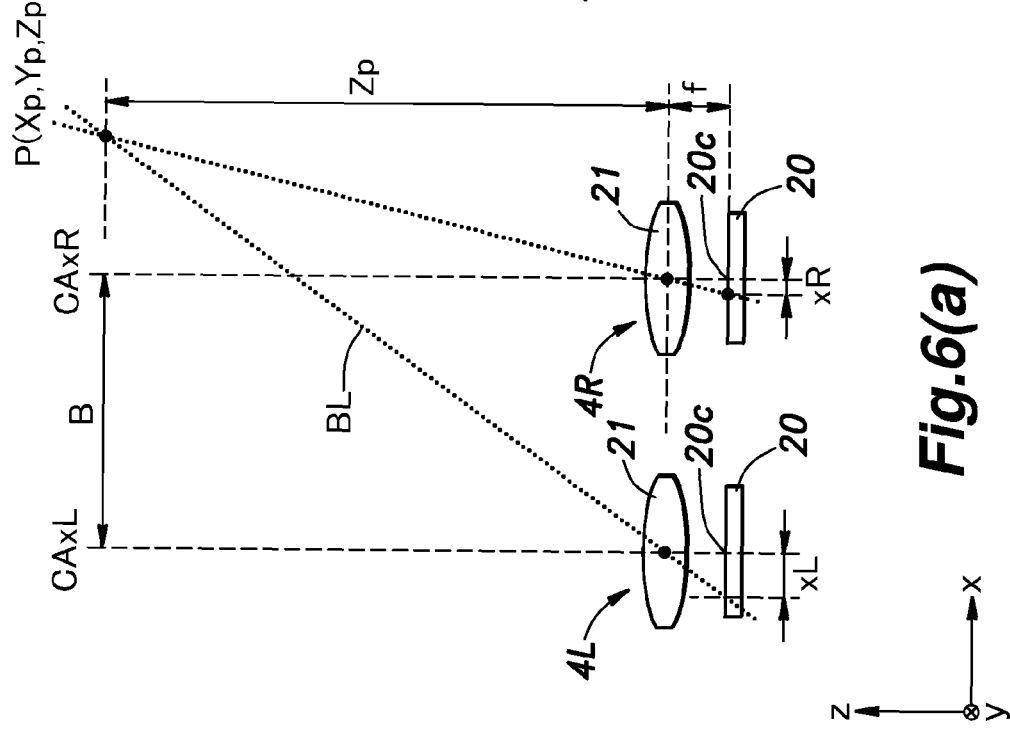
*Fig.6(a)*
*Fig.6(b)*

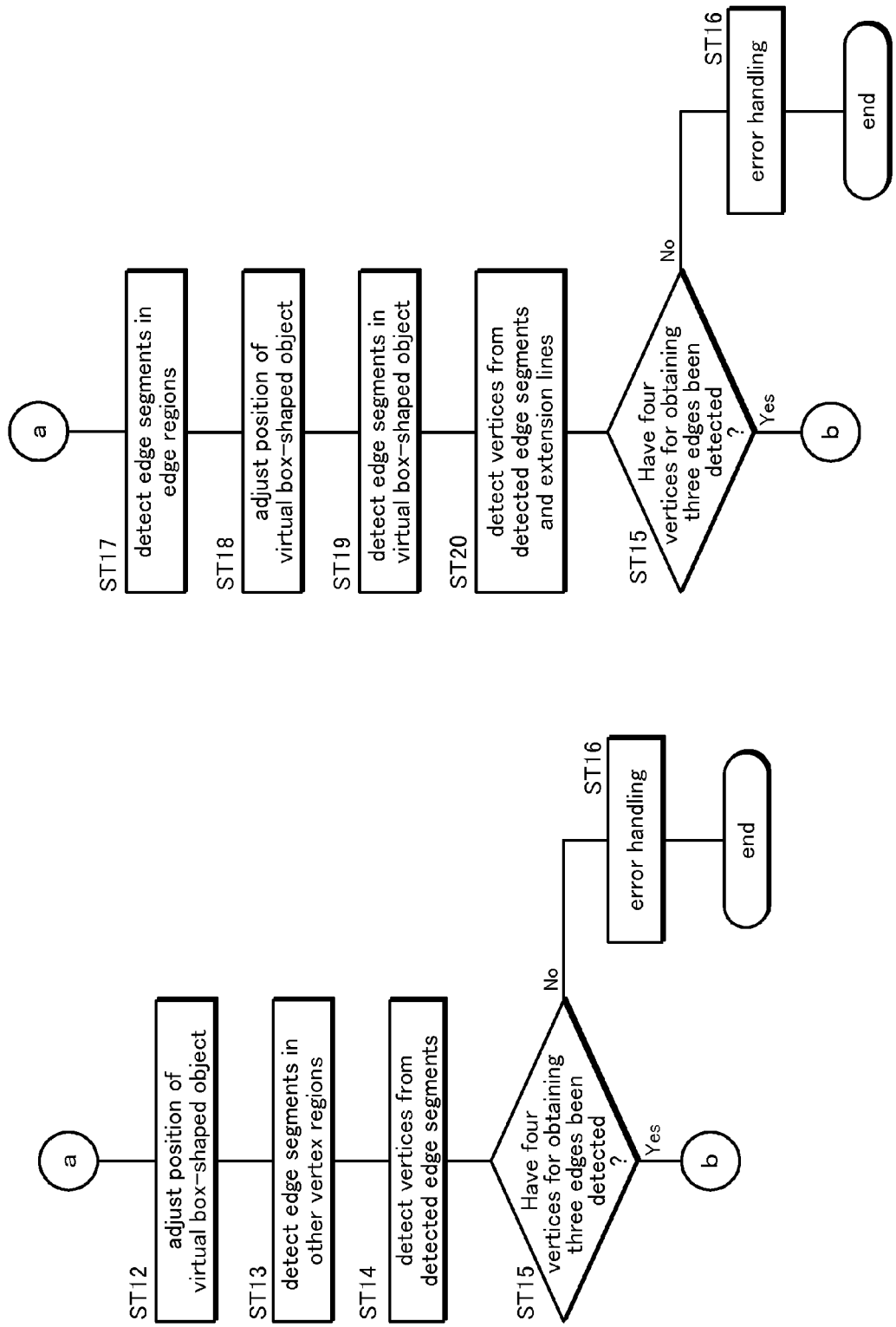

SIZE MEASUREMENT DEVICE AND SIZE MEASUREMENT METHOD

RELATED APPLICATIONS

This application is a Continuation-in-Part of International Application No. PCT/JP2013/003819, filed Jun. 19, 2013, which claims the benefit of Japanese patent application No. 2012-148406, filed Jul. 2, 2012, the disclosures of which are incorporated by reference herein in their entireties.

TECHNICAL FIELD

The present invention relates to a size measurement device and a size measurement method for measuring a size of an object from captured image data.

BACKGROUND ART

It is known in a wide range of fields to affix a label having a barcode or the like printed thereon to the packages of articles to manage the delivery of the articles in logistics and production processes. For example, there is an article delivery management system in which, when articles are transported, the information on the labels affixed to the packages packing the articles are read by a handy terminal or the like equipped with a barcode reader at the collection and delivery center to identify the articles, whereby, based on the identification information, the distribution channel of each article is determined, transfer of the article is confirmed, and so on. In such a system, in addition to reading the information on the labels and sorting the articles in accordance with the respective destinations, it is necessary to measure the size of each package to determine the capacity and the number of transport vehicles for transportation.

As a means for measuring the size of the package using a captured image, there is a size measurement device which, provided that the package packing an article has the shape of a cube or a rectangular parallelepiped and the label size is known, captures an image of the package and the label affixed thereto at the same time and measures the package size using the length of the label in the captured image as a reference length (for example, see JP2004-219255A).

However, when the size of an object is measured based on the captured image data thereof, how to determine the feature points (vertices in the case of a package) serving as a reference for size measurement of the object is significant. In a case where the feature points are extracted only by image processing for performing edge detection, etc., the processing is performed for the entire image data, and therefore, not only the processing load is large but also the object that the user desires to measure may not be extracted efficiently.

In a case where the user designates the feature points, it may be conceived to display the captured image data on a display device so that the user can designate the feature points by use of an input device. However, due to the hardware limitations related to the display device and the input device, it is difficult for the user to accurately indicate the coordinates serving as feature points.

Further, JP2004-219255A discloses that the user may designate vertices of a package by means of laser light. However, the vertices of a package and the laser light are ideally points, and it is not easy for the user to accurately irradiate laser light onto the vertices of a cardboard box at the site, for example.

A purpose of the present invention is to provide a size measurement device and a size measurement method capable of measuring the external size of a package having the shape of a cube or a rectangular parallelepiped with a high accuracy based on the designation performed easily by the user.

SUMMARY OF THE INVENTION

In a first aspect of the present invention made to achieve the foregoing object, there is provided a size measurement device for measuring a size of an object from a captured image of the object, the device including: an imaging unit that captures an image of an object; a display unit that displays image data captured by the imaging unit; an input unit for inputting instructions of a user; a region setting unit that, when positions are designated with the input unit in the image data displayed on the display unit, sets surrounding regions including therein respective designated positions; and a feature point determination unit that determines, in the surrounding regions set by the region setting unit, feature points providing coordinates of the object to be measured.

In such a structure, when the user designates positions in the displayed image, surrounding regions including therein respective designated positions are set, whereby the process of determining the feature points providing the coordinates of the object to be measured, namely, search for the vertices, may be performed only in the predetermined surrounding regions instead of for the entire screen, and thus, the processing load can be reduced.

According to a second aspect of the present invention, the device of the first aspect of the present invention is configured to further include a measurement unit that, when the feature points are determined in at least two surrounding regions, calculates a distance between the two feature points based on the captured image data. In this structure, the distance between the two feature points is calculated and can be used to obtain the size of the package.

According to a third aspect of the present invention, in the device of the first aspect of the present invention, the surrounding regions set by the region setting unit are displayed on the display unit. In this structure, the surrounding regions corresponding to the vertices of the package designated by the user are displayed on the display unit, and thus, the user can readily check the designated positions.

According to a fourth aspect of the present invention, in the device of the first aspect of the present invention, each surrounding region set by the region setting unit is circular in shape. Further, according to a fifth aspect of the present invention, in the device of the first aspect of the present invention, each surrounding region set by the region setting unit is rectangular in shape. In these structures, each surrounding region is set as a circle or a rectangle, and therefore, it is possible to easily set edge regions connecting the surrounding regions, for example.

According to a sixth aspect of the present invention, in the device of the first aspect of the present invention, the imaging unit includes a first camera and a second camera which are positioned to be spaced apart from each other by a predetermined distance to capture images of the object from different positions simultaneously, and the measurement unit calculates the distance between the feature points by performing arithmetic processing based on information on parallax between the first and second cameras. In this structure, owing to the stereo vision, it is possible to obtain the positions of the vertices even more accurately with a simple structure.

According to a seventh aspect of the present invention, in the device of the first aspect of the present invention, the input unit and the display unit are constituted of a touch panel. In this structure, by designating positions with a stylus, for example, the user can easily perform instruction operations. Further, the designated points (touched points) can be detected easily and the regions having a predetermined size and surrounding the respective designated points can be set easily.

According to an eighth aspect of the present invention, in the device of the first aspect of the present invention, the imaging unit captures images of a package having a shape of a rectangular parallelepiped as the object, and when four points including a vertex to which three edges of the package converge and end points of the three edges converging to the vertex which are opposite to the vertex are designated with the input unit as points to be measured for the image displayed on the display unit, the region setting unit sets the surrounding regions for the four points, respectively, and the feature point determination unit determines a feature points in each surrounding region.

In this structure, when four points including a vertex to which three edges forming the package displayed on the screen of the display unit converge and end points of the three edges converging to the vertex which are opposite to the vertex are designated by the user with a stylus, for example, each designated point (touched point) is detected and surrounding regions having a predetermined size and surrounding the respective designated points are set. Then, by obtaining, in each surrounding region, a point to which three edges of the package converge as a vertex position, it is possible to readily obtain the vertices of the package.

According to a ninth aspect of the present invention, the device of the eighth aspect of the present invention is configured to further include a measurement unit that, when the four feature points have been determined, calculates lengths of edges of the package based on positions of the four feature points. In this structure, the lengths between the vertices can be obtained as the lengths of the three edges, and thus, the external size of the package can be obtained with a high accuracy.

According to a tenth aspect of the present invention, in the device of the eighth aspect of the present invention, in a case where a feature point was not detected in any of the four surrounding regions set for the designated positions of the four points, the region setting unit infers, based on positional relationship between the four surrounding regions, other surrounding regions including therein positions not designated by the user, and the feature point determination unit obtains the feature points in the inferred surrounding regions.

In this structure, in a case where a feature point was not detected in any of the four surrounding regions designated by the user, other surrounding regions including therein positions not designated by the user are inferred, and feature points (vertices) are detected in these surrounding regions. By utilizing the knowledge that the package as an object to be measured substantially has the shape of a rectangular parallelepiped, surrounding regions at the positions (vertices) not designated by the user can be inferred, and thus, even in a case where the image was captured under a poor lighting condition, for example, it is possible to measure the package size accurately.

According to an eleventh aspect of the present invention, in the device of the eighth aspect of the present invention, in a case where a feature point was not detected in any of the four surrounding regions, the feature point determination unit extracts at least two edges in spaces between the surrounding region in which the feature point is not detected and at least two other surrounding regions adjoining thereto, and regards a point of intersection or a smallest distance point between the extracted two edges as a feature point corresponding to the surrounding region in which a feature point was not detected.

In this structure, in a case where a feature point was not detected in any of the four surrounding regions designated by the user, edges are extracted in the spaces connecting the four surrounding regions designated by the user, such that the point of intersection or smallest distance point between any extracted edges can be regarded as indicating the position of a feature point (vertex). Each edge is constituted of a line segment and generally can be detected with a higher probability than a point, and thus, even in a case where the image was captured under a poor lighting condition, for example, it is possible to measure the package size accurately.

According to a twelfth aspect of the present invention, there is provided a size measurement method for measuring a size of an object from a captured image of the object, the method including: capturing an image of the object; displaying captured image data; setting, when a user designates positions in the displayed image data, surrounding regions including therein respective designated positions; and determining, in the surrounding regions, feature points providing coordinates of the object to be measured.

In this structure, when the user designates positions in the displayed image, a steps are performed to set surrounding regions including therein respective designated positions and determine feature points providing coordinates of the object to be measured, whereby determination of the feature points such as the vertices of a package, namely, searching of the vertices, may be performed only in the surrounding regions including therein the positions designated by the user, instead of for the entire screen, and thus, the processing load can be reduced.

BRIEF DESCRIPTION OF THE DRAWINGS

FIG. 6(a) is an explanatory diagram showing a relationship between an object P to be image and left and right cameras for stereo vision, and FIG. 6(b) is an explanatory diagram for explaining the principle of obtaining a distance Zp between the cameras and the object P (distance measurement);

FIG. 9(a) is a diagram showing a branch process for exception handling in the flow of FIG. 4, FIG. 9(b) is a diagram showing another example of the branch process;

DETAILED DESCRIPTION OF THE PREFERRED EMBODIMENTS

In the following, embodiments of the present invention will be described with reference to the drawings.

Figure 1:
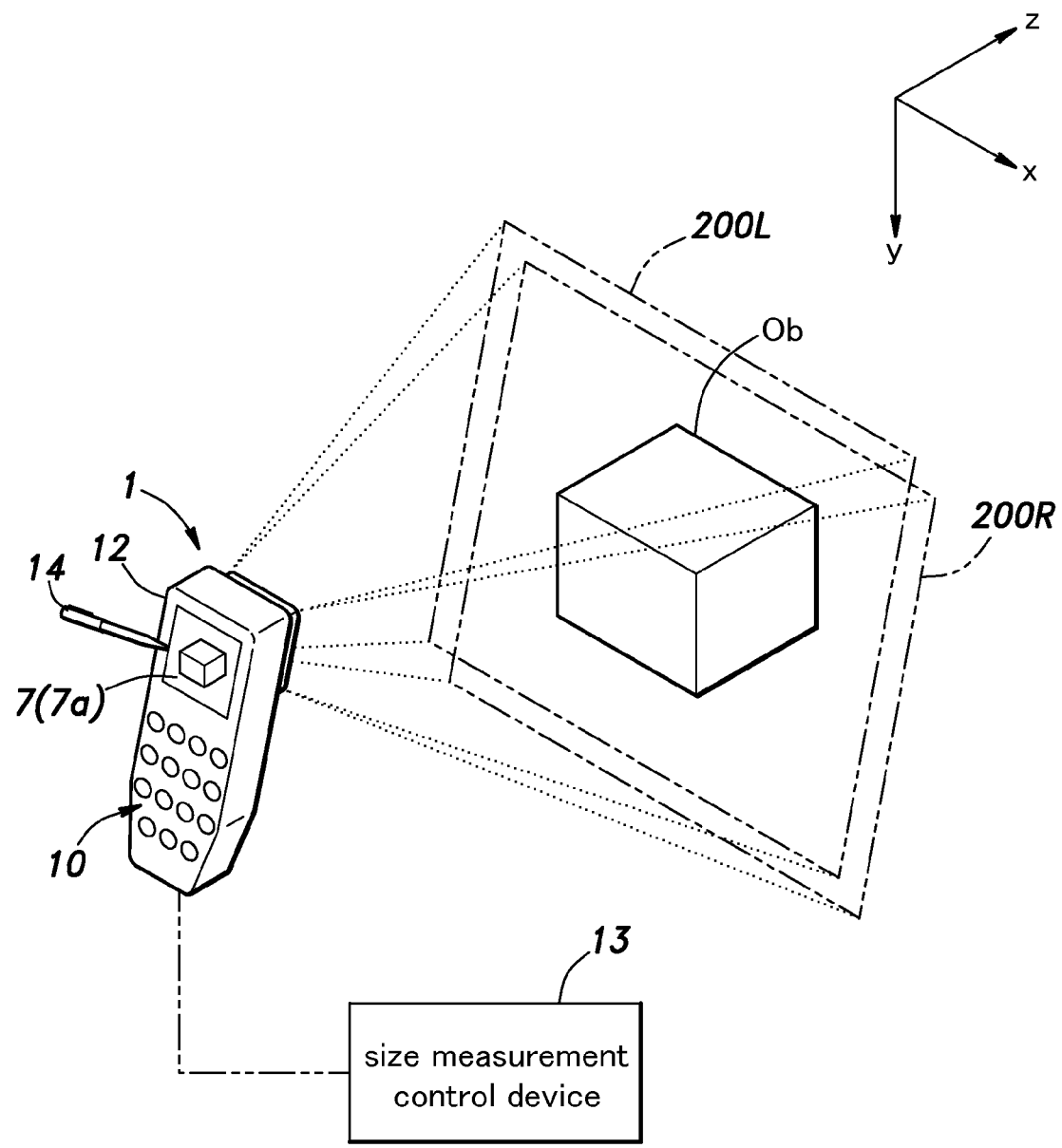
FIG. 1 is an explanatory diagram for explaining a state of use of a size measurement device according to an embodiment of the present invention.

FIG. 1 is an explanatory diagram for explaining a state of use of a size measurement device 1 according to an embodiment of the present invention. In this embodiment, a hexahedral body used for packaging a product or the like; namely, a package (e.g., a cardboard box, etc.) Ob substantially having the shape of a rectangular parallelepiped or a cube is taken as an example of an object to be measured, and the outer dimensions thereof; namely, the lengths of the three edges (W: Width, L: Length, H: Height) constituting the package Ob are measured in a non-contact manner. It is to be noted, however, that the object is not limited to a package.

The size measurement device 1 in the present embodiment is constituted of a size measurement terminal 12 and a control device 13. The size measurement terminal 12 may be installed in a device such as a handy terminal used at a logistics site for managing articles in logistics processes, such as reception, check-in, inventory, check-out and shipping, and is used in these processes. As shown in FIG. 1, a user uses the size measurement device 1 to measure the size of an package Ob whose size is to be measured. More specifically, the user captures an image of the package Ob with the size measurement terminal 12, and based on the captured image data, the control device 13 calculates the lengths of the edges of the package Ob. The size measurement device 1 may be embodied as a terminal device having the size measurement terminal 12 and the control device 13 integrally incorporated therein, or as a system in which the size measurement terminal 12 and the control device 13 are connected via a communication line. The communication line does not have to be a local area network and may be a wide area network such as the Internet. It is conceivable that the size information obtained by the size measurement device 1 is cumulatively stored in a database of a server or the like installed in a management center or the like not shown in the drawings, so that the size information can be utilized. In such a case, the information may be used to determine the transportation fee of each package and/or to optimally combine the multiple packages and determine the types and/or number of the trucks necessary for the transportation, thereby permitting efficient use of the resources in the transportation business. Further, the size measurement terminal 12 is not limited to a dedicated terminal such as a handy terminal, and may be realized by a terminal such as a tablet or a smartphone having a dedicated application installed therein. The control device 13 may be realized as a personal computer, a dedicated set top box or the like. The control device 13 may have a function of outputting labels formed based on the measured size information.

Figure 2:
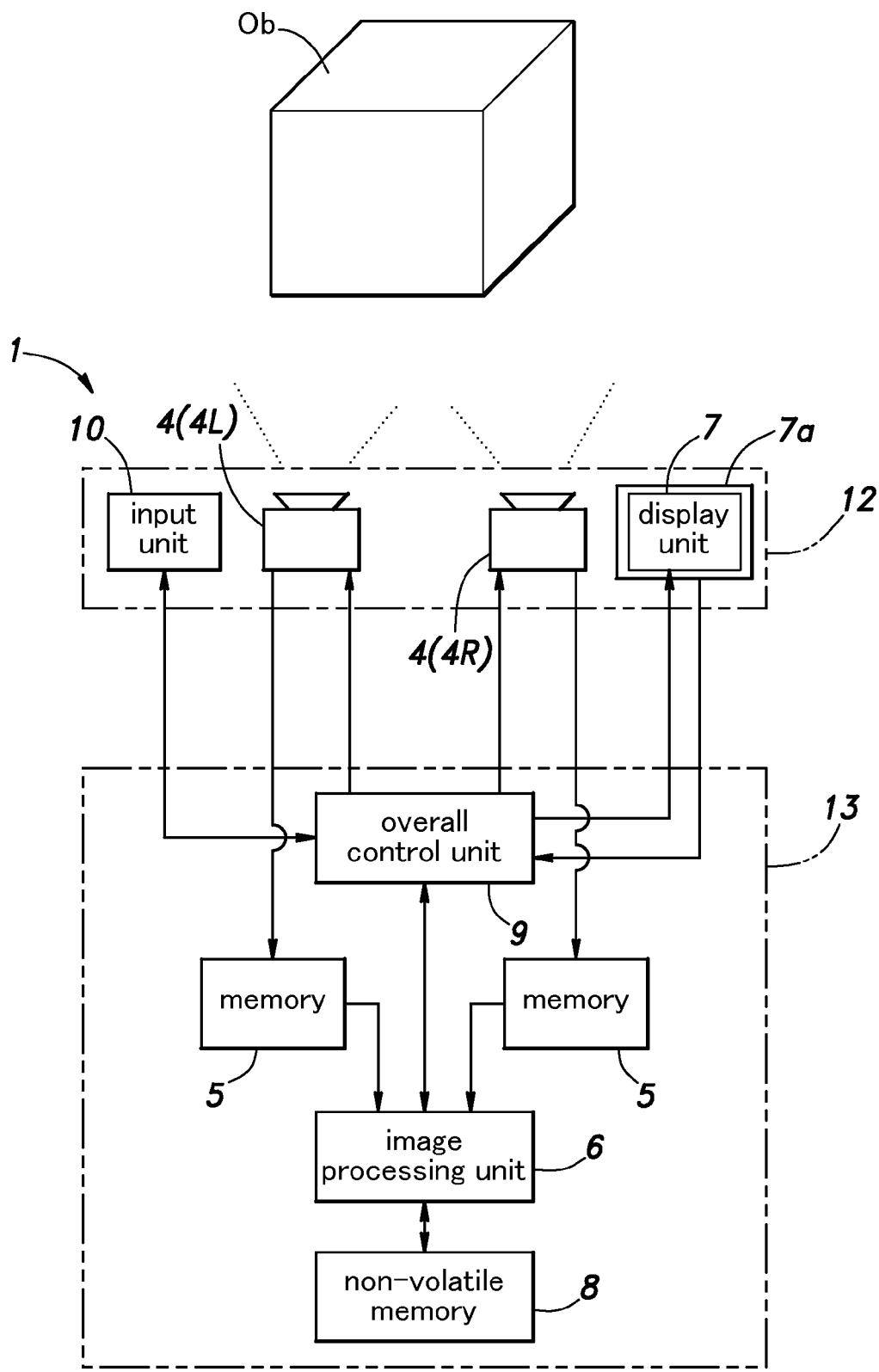
FIG. 2 is a block diagram showing a structure of the size measurement device according to the embodiment of the present invention.

FIG. 2 is a block diagram of the size measurement device 1. As shown in FIG. 2, the size measurement device 1 in this embodiment includes the size measurement terminal 12 and the control device 13. The size measurement terminal 12 is provided with a left camera (first camera) 4L and a right camera (second camera) 4R (when it is not necessary to distinguish between left and right, they may be simply referred to as cameras 4) that capture images of the entirety of the package Ob from different angles, a display unit 7 constituted of a liquid crystal display, for example, a touch panel 7a disposed over the display unit 7 and serving as a designated point detection means, and an input unit 10 including switches, press buttons and the like and allowing input of user instructions such as for a shutter operation when capturing images. The cameras 4 constitute an imaging unit of the present invention, the display unit 7 constitutes a display unit of the present invention, and the input unit 10 constitutes an input unit of the present invention. The display unit 7 and the input unit 10 may be provided to the control device 13. The control device 13 is constituted of memories 5 temporarily storing the left and right image data captured by the cameras 4, an image processing unit 6 that processes the image data stored in the memories 5 to calculate the lengths of three edges of the package Ob, a non-volatile memory 8 that records the image data which was used by the image processing unit 6 for parallax computation and based on which the measurement result was obtained, and an overall control unit 9 that controls the overall operation of the size measurement device 1. The image processing unit 6 is constituted of a high-speed CPU (Central Processing Unit), a DSP (Digital Signal Processor), a memory, etc. not shown in the drawings, and, as will be described later, plays a main role in measuring the package size. The image processing unit 6 constitutes a region setting unit, a feature point determination unit and a measurement unit of the present invention.

The overall control unit 9 includes a CPU, an EEPROM (Electrically Erasable Programmable Read-Only Memory) storing programs, and a work memory, which are not shown in the drawings. The overall control unit 9 manages the entirety of the size measurement device 1 including the image processing unit 6 by treating each task managed by a predetermined RTOS (Real-time operating system) as a unit.

It is to be noted that the aforementioned term "capture images from different angles" is not limited to a case where the optical axes of the two cameras form an angle of convergence relative to the object to be imaged, and may include a case where the optical axes of the two cameras are parallel to each other and the positions of the object and the two cameras form a triangle. Namely, "capture images from different angles" may be rephrased as "capture images from different positions (points of view)." In the following, a description will be made of an exemplary arrangement in which the optical axes of the two cameras are parallel to each other.

Figure 3A:
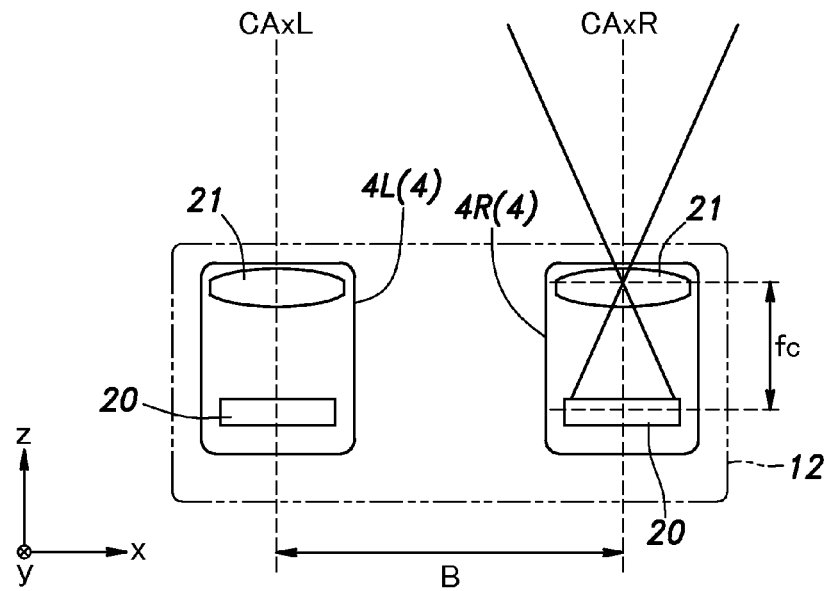
FIG. 3(a) is a top view of a camera part of the size measurement terminal and FIG. 3(b) is a front view of the camera part.
Figure 3B:
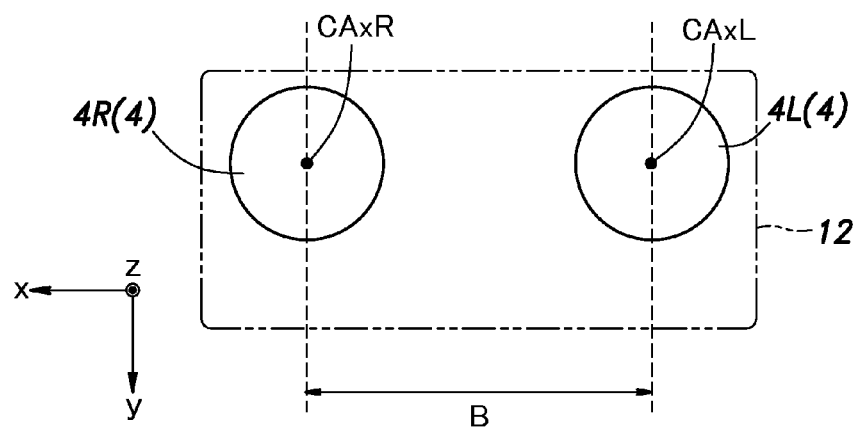

FIG. 3 is a diagram showing the structure of the cameras 4 of the size measurement terminal 12 according to the embodiment of the present invention. FIG. 3(a) shows a top view of a portion including the cameras 4, while FIG. 3(b) shows a front view of the same. It is to be noted that the coordinate system shown in FIGS. 3(a) and 3(b) corresponds to that shown in FIG. 1, where x indicates the direction of a baseline length B (for example, raster direction), y indicates the direction perpendicular to the direction of the baseline length B in the imaging surface of an imaging device 20, and z indicates the direction from the cameras 4 toward the object, i.e., the direction of depth of the captured image.

In each camera 4, reference numeral 20 in FIG. 3(a) represents an imaging device (two-dimensional image sensor) such as a CMOS (Complementary Metal Oxide Semiconductor) or a CCD (Charge Coupled Device), and reference numeral 21 represents a lens for forming an image on the imaging surface of the imaging device 20, namely, an imaging optical system (whose focal length is fc). As described above, the size measurement device 1 in the present embodiment includes two cameras, namely, the left camera 4L and the right camera 4R, and these cameras 4 are equipped with the same imaging device 20 and the same imaging optical system 21. The optical axis of the left camera 4L is represented by CAxL while the optical axis of the right camera 4R is represented by CAxR, and the distance between these optical axes (baseline length B) is set at 50 mm, for example. It is to be noted that either of a single plate type color sensor and a monochrome sensor without a color filter may be used as the imaging device 20, but in a case where the imaging device 20 is used in an application requiring a high resolution, such as barcode reading or package size measurement, it is preferred to use a monochrome sensor.

As shown in FIG. 3(a), when the cameras 4 are seen from above (in the y-direction), the optical axes CAxL and CAxR of the cameras 4 are parallel to each other and are apart from each other by the baseline length B. Further, as shown in FIG. 3(b), when the cameras 4 are seen from the front (in the z-direction), the optical axes CAxL and CAxR of the cameras 4 are placed at the same position in the y-direction.

Next, with reference to the flowchart of FIG. 4, a description will be given of an outline of the process of a size measurement execution task that operates on the size measurement device 1 according to the embodiment of the present invention. The process of measuring the external size of the package Ob is managed by the size measurement execution task executed by a program. The size measurement execution task monitors the input unit 10 via the overall control unit 9.

First, in step ST0, moving image capturing is started. Specifically, the imaging devices 20 of the cameras 4R, 4L are operated based on a camera control signal output from the overall control unit 9, such that the image data captured by the left camera 4L and the right camera 4R is stored in the memories 5 corresponding to the respective cameras 4 at a predetermined frame rate such as 30 frames/sec (any frame rate may be used so long as the displayed image, which changes with the camerawork which in turn changes in response to a user's operation, is updated without causing any stress to the user). The image data temporarily stored in the memories 5 is transferred to the image processing unit 6, where the image data is subjected to known image processing such as mosaic processing, white balance adjustment, color correction, γ correction, resizing, etc. The image data processed by the image processing unit 6 is transferred by the overall control unit 9 to the display unit 7, so that the images captured by the cameras 4 are displayed on the display unit 7 in real time.

Next, in step ST1, it is determined whether a shutter button provided to the input unit 10 is pressed (presence/absence of a still image capturing instruction). In a case where the shutter button is not pressed, step ST1 is repeated (No in step ST1), and if the pressing is detected, the overall control unit 9 stops updating the image displayed on the display unit 7 and proceeds to step ST2. In step ST2, a preprocessing for the captured image is performed. As the preprocessing, auxiliary processes for improving the accuracy of a later performed edge detection are performed, which may include, for example, contrast adjustment and noise removal performed to the entirety of the image, though these processes may be performed to limited regions such as regions in the vicinity of vertices designated by the user and regions between vertices (surrounding regions and edge regions), as will be described in detail later.

It is to be noted that the ranges captured by the two cameras 4, namely, a left imaging area 200L (hereinafter, referred to as a left image) and a right imaging area 200R (hereinafter, referred to as a right image) (see FIG. 1), are different from each other, and there is a parallax between the images stored in the memories 5 depending on the distance between the size measurement terminal 12 and the package Ob which is the object to be imaged.

Further, in the preprocessing, the image data stored in the memories 5 at the time when the still image capturing instruction is detected (left and right image data captured by the left camera 4L and the right camera 4R, which, as described above, has a parallax) is forwarded to the non-volatile memory 8 and stored therein.

At this point, one of the two still images captured by the left camera 4L and the right camera 4R is displayed on the display unit of the size measurement device 1, and the user designates, in the image including the entirety of the package Ob, points based on which the size measurement is to be performed.

Figure 5:
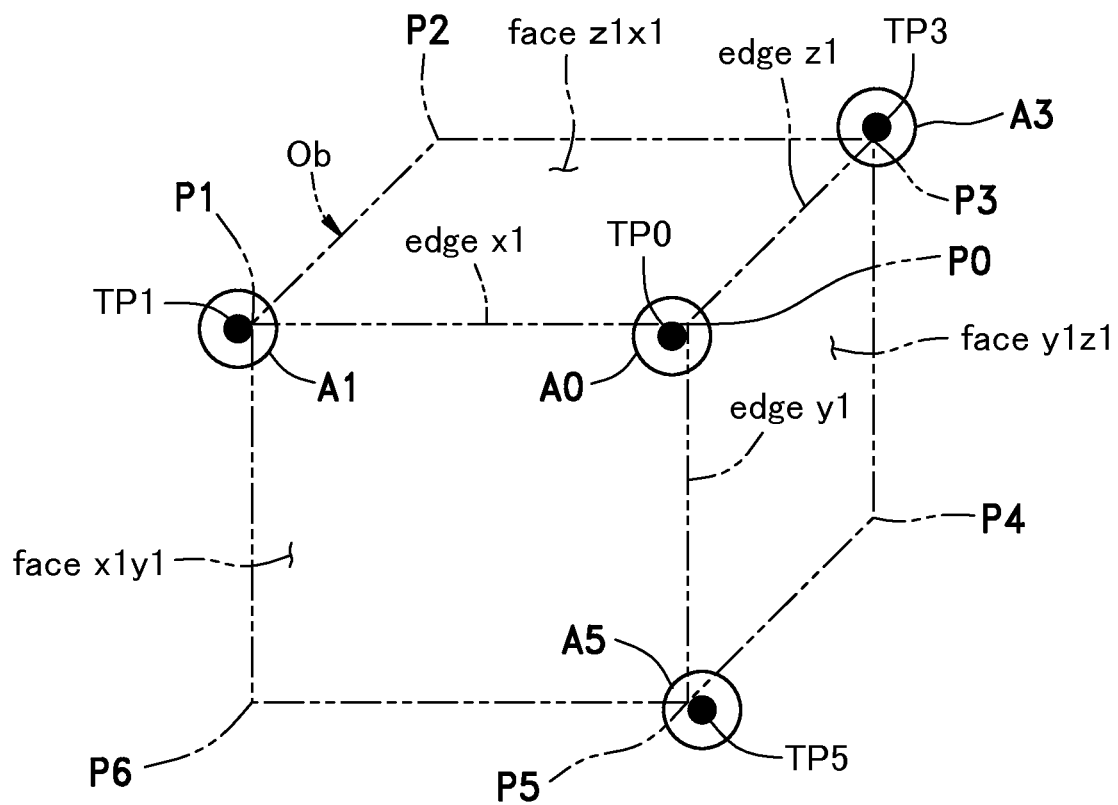
FIG. 5 is a schematic diagram showing positions designated with a stylus and surrounding regions corresponding thereto.

In step ST3, it is determined whether four vertices (P0, P1, P3, P5) serving as a reference for size measurement of the package Ob have been designated by touching the touch panel 7a with the stylus (reference sign 14 in FIG. 1), as shown by the black circles (TP0, TP1, TP3, TP5) in FIG. 5. In the present embodiment, a means for inputting a coordinate by touching the touch panel 7a is embodied as the stylus 14, but any article that can indicate a coordinate can be used, and a finger also may be used. Further, another pointing device such as a trackball or a mouse may be used instead.

If all four vertices have been designated, the flow proceeds to step ST4, but step ST3 is repeated until the four vertices have been designated. It is to be noted that the image displayed on the display unit 7 when the four vertices are designated may be either of the left and right images (200L, 200R), but in the present embodiment, a description will be made with an assumption that the left image (200L) is displayed.

The four vertices include, for example, a vertex P0 defined by three faces (face x1y1, face y1z1, face z1x1) of the package Ob displayed on the screen and vertices P1, P3 and P5 which are the ends opposite to the vertex P0 of edges x1, y1 and z1, respectively, which are defined by two of the three faces (the set of vertices P0, P1, P3 and P5 is referred to as a designated pattern PA0). As described above, the user (operator) touches the touch panel 7a with the stylus 14 held in the hand to designate vertices on the screen, but each vertex is ideally a point while the resolution of the touch panel 7a is limited and the tip of the stylus 14 has a predetermined size, and therefore, it is difficult to designate the vertices P0, P1, P3 and P5 accurately. Typically, when the user performs the designation by touching while viewing the displayed image (hereinafter referred to as "designation by touching") as shown by the black circles in FIG. 5, they tend to be displaced from the vertices P0, P1, P3 and P5, as represented by points TP0, TP1, TP3 and TP5.

When the package size is measured, the user designates four vertices, but the set of vertices designated is not limited to the aforementioned vertex P0 (vertex defined by three faces of the package Ob) and the ends opposite to the vertex P0 of the edges converging to the vertex P0.

For example, in FIG. 5, a set of vertices P1, P2, P0 and P6 (referred to as a set pattern PA1), a set of vertices P3, P2, P0 and P4 (referred to as a set pattern PA3) or a set of vertices P5, P6, P0 and P4 (referred to as a set pattern PA5) may be designated. In the set pattern PA1, the vertex P1 is a common vertex, and a line segment P1-P2, a line segment P1-P0 and a line segment P1-P6 converge to the vertex P1. In the set pattern PA3, the vertex P3 is a common vertex, and a line segment P3-P2, a line segment P3-P0 and a line segment P3-P4 converge to the vertex P3. In the set pattern PA5, the vertex P5 is a common vertex, and a line segment P5-P6, a line segment P5-P0 and a line segment P5-P4 converge to the vertex P5. Thus, the user may designate, in the captured image covering the package Ob therein, an arbitrary common vertex to which three edges converge and the ends of the respective edges converging to the common vertex which are opposite to the common vertex. In other words, it is sufficient to select four vertices that define edges respectively corresponding to W, L, H (Width, Length, Height) of the package Ob displayed on the screen.

In the following, a description will be made of a case where the vertices are designated in the aforementioned designated pattern PA0 for the sake of simplicity of explanation.

It is also to be noted that, though the description was made here of an example in which the process does not proceed to the next step until all four vertices have been designated, it is also possible to perform the processes in steps ST3, ST4 and ST5 sequentially for one designated point and repeat these processes four times.

In next step ST4, regions A0, A1, A3 and A5 respectively corresponding to the touched points TP0, TP1, TP3 and TP5 (positions where measurement is to be performed) in step ST3 are set. These are regions respectively including vertices P0, P1, P3 and P5 therein, which are respectively present in the vicinity of the touched points designated by use of the stylus 14 or the like (these regions are hereinafter referred to as surrounding regions), and, as shown by solid lines in FIG. 5, each surrounding region A0, A1, A3, A5 may be a circle having a predetermined radius and having a center at the corresponding touched point (TP0, TP1, TP3, TP5). The size of the circle may be determined taking into account the error range when the user designates the vertices of the package by touching the screen of the display unit 7, for example. Of course it is also possible to represent the range of each surrounding region as a rectangle.

The circle or rectangle representing each surrounding region may be displayed on the display unit 7 each time the touched point (any of TP0, TP1, TP3, TP5) is designated. In this way, the user can readily confirm whether the displayed circle or the like surrounds a vertex of the package Ob (one of P0, P1, P3 and P5), and this is convenient to the user. Further, though not shown in the flowchart, configuration may be made with regard to steps ST3 and ST4 such that if the user, determining that the displayed circle or the like does not surround the vertex to be designated, touches the surrounding region again with the stylus 14, the designation (made by touching) is cancelled. In this case, the display of the circle or the like is removed along with the cancellation of designation. Also, the display of the circle or the like (designation of point by touching) and the removal of the circle (cancellation of designation) may be switched alternately with every touching of the touch panel 7a. Thereby, it is possible to easily avoid a situation in which am operation of designation of a vertex actually results in the surrounding region not surrounding the vertex, and thus, the usability is improved.

When the four vertices surrounded by the corresponding surrounding regions have been designated as described above, the processes in steps ST3 and ST4 are completed.

In next step ST5, edge detection is performed in each surrounding region A0, A1, A3, A5 in the left image (200L) to obtain edge images. As a method for detecting edges, as disclosed in Japanese Patent No. 4338405, for example, it is possible to use a first-order differential operator to detect horizontal and vertical components of edges with three-by-three filters, generate edge images by combining the processing results, binarize the edge images after the filtering process, and track (trace) the edges after the binarization. In determining an end of each edge in this edge tracing, as disclosed in the above patent document, when the number of pixels between the position where the continuity of an edge is terminated and the position where the next edge is detected is greater than a predetermined value or when the number of contiguous pixels of the next edge is smaller than a predetermined value, the position where the continuity is terminated can be determined as an end of the edge. Further, with regard to the determination of an end of each edge, in addition to the general condition as described above, it is possible to use an additional condition that the range of tracing is within each surrounding region. This additional condition ensures that the tracing stops without fail. It is to be noted here that by using a rectangular surrounding region, it is possible to determine quickly whether these conditions are met (it is also possible to use a circular surrounding region in display, while using a rectangular surrounding region in the determination of termination of tracing). Thereby, as shown in FIG. 8, for example, it is possible to detect edge segments (thick lines in the drawing) E corresponding to the three edges that converge to a vertex in each surrounding region A0, A1, A3, A5 and to obtain edge images. As the range in which the edge detection is performed is limited to the inside of each surrounding region, a high-speed processing can be achieved.

It is to be noted that though the description was made here of the edge segments corresponding to the three edges, in some cases not all of the three edges are shown in the captured image depending on the camerawork at the time of image capture and/or on the vertex designated (for example, in the case of the aforementioned set pattern PA1), and thus, there may be cases where edge segments corresponding to two edges are used (not shown in the drawings).

In next step ST6, it is determined whether effective edge segments have been detected in each of the surrounding regions A0, A1, A3 and A5 by the edge detection performed in step ST5. If three edge segments converging to a point are detected in one region, it is possible to obtain a vertex of the package Ob reliably, but even in a case where two edge segments converge to a point, the point of intersection can be determined as a vertex. If edge segments effective for obtaining a vertex have been detected in each surrounding region A0, A1, A3, A5, the flow proceeds to step ST7, and if there is at least one surrounding region for which effective edge segments have not been found, the flow proceeds to later-described step ST12 (or step ST17 which is another example of a branch process).

The determination of whether effective edge detection has been performed can be made, for example, by detecting a contrast difference between a part determined to constitute an edge in the edge tracing and another part, and accumulating the absolute value of the contrast difference obtained for each pixel assessed in the tracing to create an evaluation function. In general, the larger the contrast difference is, the easier an edge can be detected, and therefore, if the value of the evaluation function is larger than a predetermined threshold value, it can be inferred that effective edge detection has been performed.

In step ST7, a coordinate of a point of intersection of the edge segments detected in each surrounding region A0, A1, A3, A5 is obtained. As described in the foregoing, the point of intersection of the edge segments in each surrounding region represents a vertex to which three edges of the package Ob converge.

The shape obtained by connecting the touched points (TP0, TP1, TP3 and TP5 shown in FIG. 5) changes depending on the state of arrangement of the package Ob, and it is possible to calculate the coordinate of each vertex by use of this feature. In the following, a description will be made with reference to FIG. 8(a). In the captured image, for example, a shape pattern of the three edges converging to the common vertex P0 (such as angles between the edges) is considered to substantially correspond to (or resemble) the pattern in the vicinity of the surrounding region A0. Further, a shape pattern obtained by extending the edge z1, which is connected to the vertex P0, beyond the surrounding region A0 and deleting the original edge z1 is considered to substantially correspond to (or resemble) the pattern in the vicinity of the vertex P3. This also applies to the patterns in the vicinity of the vertices P1 and P5. Namely, it is possible to infer the shape of the edges connected to each vertex from the shape of the edges converging to the common vertex P0. Thus, by creating a pattern of edges in the vicinity of each of the four vertices based on the positional relationship between the four touched points and matching the edge images generated by the edge tracing with the edges, it is possible to determine the coordinates of the vertices P0, P1, P3 and P5 serving as the feature points (for example, two-dimensional coordinates in the left image; specifically, xy coordinates of the imaging sensor capturing images including the vertices therein).

Figure 8A:
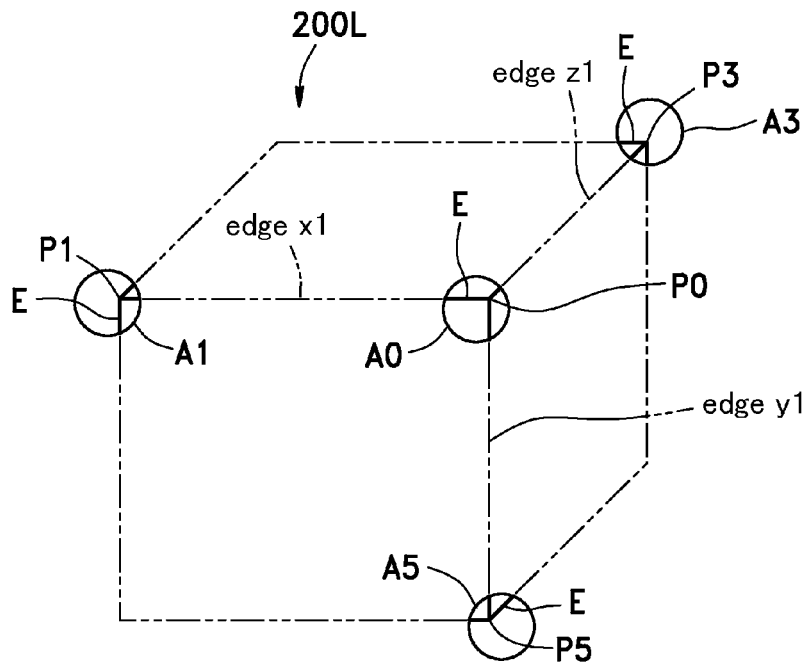
FIG. 8(a) is a diagram showing a left image illustrating edge detection in each surrounding region shown in FIG. 5.
Figure 8B:
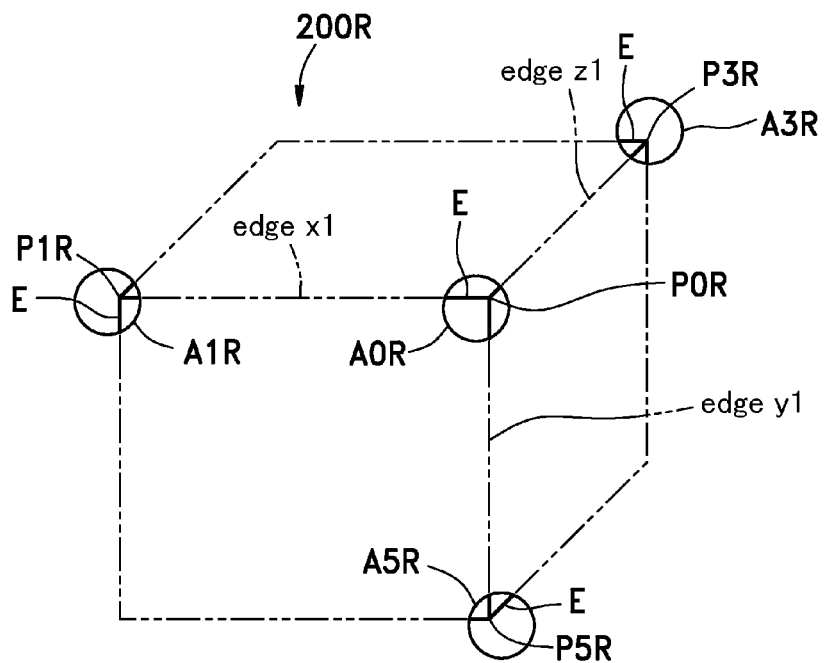
FIG. 8(b) is a diagram showing a right image.

In next step ST8, in correspondence with the surrounding regions A0, A1, A3 and A5 in the left image (200L) shown in FIG. 8(a), surrounding regions A0R, A1R, A3R and A5R are set in the right image (200R) as shown in FIG. 8(b). Then, the coordinates of the vertices P0R, P1R, P3R and P5R are obtained from these surrounding regions.

In the following, this step will be described in detail.

Generally, in stereo cameras, calibration between the left and right cameras 4L and 4R in the shift direction along the y-axis and the z-axis and in the rotational direction around the x-axis, the y-axis and the z-axis shown in FIG. 1 as well as adjustment based on the result of the calibration have been performed during the manufacturing process, for example, and it may be considered that the parallax in captured images of an object can be caused only in the x-axis direction. According to this assumption, the images of the package Ob captured by the left and right cameras 4L and 4R shift in the x-axis direction (left and right direction) relative to each other, such that when the origins of the left and right images (for example, the upper left point of each imaging area) are aligned, the object in the right image is shifted to the left along the x-axis (in a negative direction when the direction indicated by the arrow in the coordinate system shown in FIG. 1 indicates a positive direction) relative to the object shown in the left image.

Further, as will be described in detail later, the baseline length B between the left and right cameras 4L and 4R, the pixel pitch and size of the imaging sensor mounted in each camera, the focal length f of the optical system, etc. are known fixed values in the measurement system, and, given a practical restriction that the distance to the object to be measured is in a range of about 1 to 2 meters, for example, at the site where the size of the package is measured, it is possible to estimate an amount of displacement (number of pixels) of the object between the left and right images captured by the stereo camera.

Consequently, it is possible to infer which regions in the right image the points (TP0, TP1, TP3, TP5) in the left image designated by the user by touching respectively correspond. In this way, it is possible to determine the touched points in the right image and, based on which surrounding regions (A0R, A1R, A3R, A5R) are defined. Then, as in the process for the left image described above, edge segments are detected in each surrounding region, and coordinates of vertices (P0R, P1R, P3R, P5R) are eventually obtained as two-dimensional coordinates in the right image.

From the description made in the foregoing, it is apparent that the vertices P0, P1, P3 and P5 in the left image correspond to the vertices P0R, P1R, P3R and P5R in the right image, respectively. For, in the present embodiment, for example, the surrounding region A0 is defined around the touched point TP0 designated for the vertex P0, and based on the distance between the cameras 4 and the package Ob in a use situation, the surrounding region A0R surrounding the corresponding vertex P0R in the right image is defined, so that the coordinates (two-dimensional coordinates) of the vertices P0 and P0R are obtained independently for the respective left and right surrounding regions (the same applies to the vertices P1 and PR1, the vertices P3 and P3R, and the vertices P5 and P5R).

In a case where the coordinates of the vertices have been obtained in each of the left and right images as described above, a corresponding point search process called a stereo matching process becomes unnecessary. In a case where a highly accurate parallax is desired, it is possible to perform the stereo matching process to obtain a highly accurate parallax.

Figure 7:
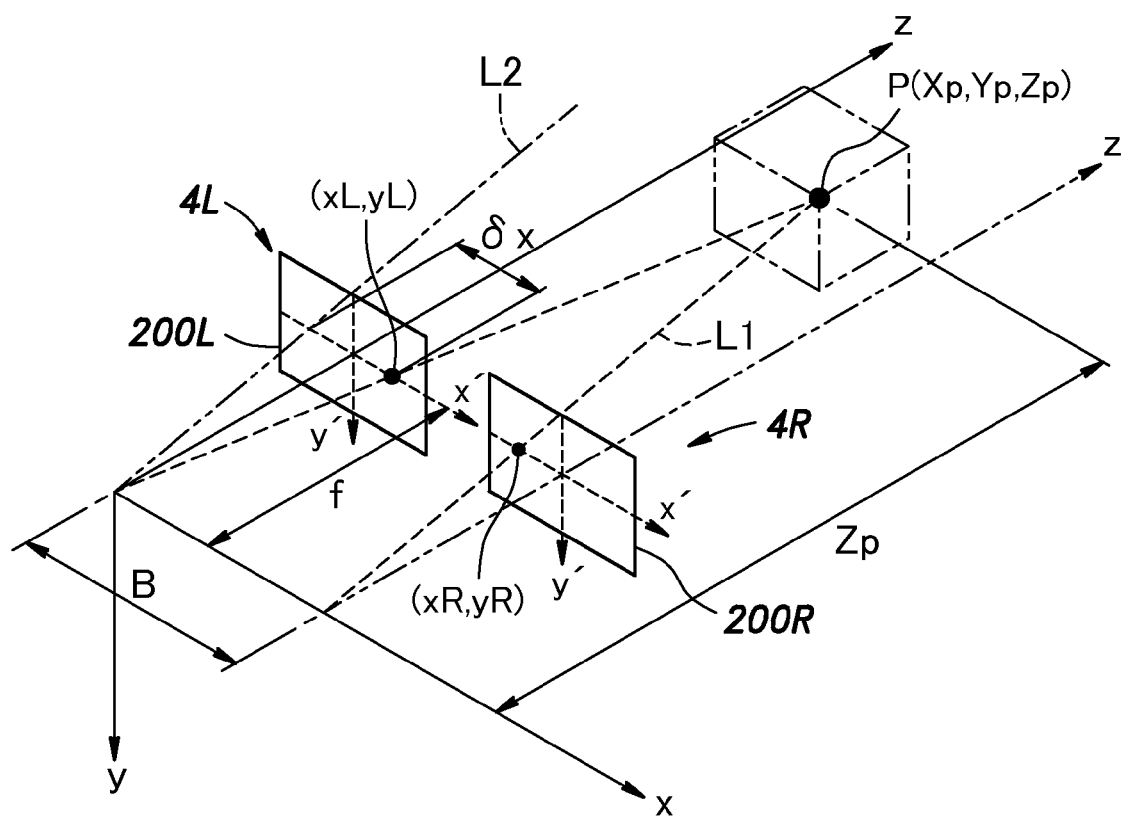
FIG. 7 is a perspective view for explaining the principle of obtaining the distance Zp between the cameras and the object P (distance measurement)

FIG. 6 is an explanatory diagram for explaining the principle of obtaining a distance Zp (distance measurement) between an arbitrary point on the object to be imaged (point of interest P) and the cameras 4 for stereo vision in relation to the size measurement device 1 according to the embodiment of the present invention, where FIG. 6(a) shows a positional relationship between the object to be imaged and the cameras 4, while FIG. 6(b) is a similar diagram in which an epipolar line EL is added as an auxiliary line. FIG. 7 is an explanatory diagram for explaining how the principle of distance measurement explained for the two-dimensional space can be extended to three-dimensional space in relation to the size measurement device 1 according to the embodiment of the present invention.

In the following, with reference to FIGS. 6(a) and 6(b), a description will be made of the principle of three-dimensional distance measurement and the process for obtaining the spatial coordinate (Xp, Yp, Zp) of the point of interest P. It is to be noted that the coordinate system used in FIGS. 6(a) and 6(b) is the same as that used in FIG. 1, FIG. 3, etc.

In FIG. 6(a), the point of interest P is included in each of the imaging areas of the left camera 4L and the right camera 4R, but the point of interest P is displaced from the optical axis CAxL of the left camera 4L and the optical axis CAxR of the right camera 4R to the right in the x-direction in the drawing. As a result, with reference to the point of intersection 20c between each optical axis and the corresponding imaging device 20, the point of interest P is shifted to the left in the x-direction by xL in the left camera 4L and by xR in the right camera 4R on the imaging surface of each imaging device 20.

As shown in FIG. 6(b), a line EL passing the center point of the imaging optical system 21 of the right camera 4R is added as an auxiliary line. It is to be noted here that the line EL is formed by projecting a line BL that connects the imaging optical system 21 of the left camera 4L with the point of interest P to the right camera 4R, and thus, the line BL and the EL are parallel to each other. In such a drawing, a triangle Oαβ and a triangle Ouζ formed on the side of the right camera 4R are similar to each other. When the image captured by the right camera 4R is referred to as a base image and the image captured by the left camera 4L is referred to as a reference image, the point xR in the base image (an amount of displacement from the optical axis CAxR in the x-direction) is moved to the point xL (an amount of displacement from the optical axis CAxL in the x-direction) in the reference image, and thus, an amount of movement in the x-axis direction |xL−xR| is defined as a parallax δx in the base image, where δx=|xL−xR|. Provided that the focal length of the lens is represented by f, the distance (baseline length) between the optical axes of the two cameras 4 distance is represented by B, the distance (depth) Zp can be computed as follows:

$$Zp = f \times (B/\delta x) \quad \text{(Equation 1)}$$

With reference to FIGS. 6(a) and 6(b) viewing the left camera 4L and the right camera 4R from above (in the y-axis direction), the principle of three-dimensional distance measurement has been explained with respect to the parallax caused in the x-axis direction (in the direction of the baseline length B). However, as shown in FIG. 7, the actual imaging devices 20 are positioned in the three-dimensional space, and the point of interest P is projected onto a certain pixel located in the imaging surface (x'y' plane) of each imaging device 20. This x'y' plane is the imaging surface of each imaging device 20, and thus, as will be understood from FIG. 6(b), etc., is essentially the same as the aforementioned xyz coordinate system. Thus, the point of interest P is projected onto a coordinate (xL, yL) in the imaging device 20 of the left camera 4L and onto a coordinate (xR, yR) in the imaging device 20 of the right camera 4R, where concrete coordinate value are obtained based on the images output from the cameras 4.

Then, once the distance Zp is obtained based on Equation 1, the coordinate values Xp, Yp, Zp of the point of interest P can be obtained by use of the coordinate (xR, yR) of the point of interest P observed in the base image (e.g., the image captured by the right camera 4R) as shown in Equation 2:

$$(Xp, Yp, Zp) = ((Zp/f) \times R, (Zp/f)yR, (B \times f)/\delta x) \quad \text{(Equation 2)}$$

$$= (B/\delta x)(xR, yR, f)$$

As described in the foregoing, the size measurement device 1 includes the two cameras 4, and the positions of the left camera 4L and the right camera 4R in the size measurement device 1 are determined uniquely by design. Namely, the distance between the optical axes of the left camera 4L and the right camera 4R (baseline length B) is a fixed value determined by design, and the focal length f of the imaging optical system 21 mounted to each of the left and right cameras 4 is also a fixed value. Therefore, if the same feature point can be extracted from the images respectively captured by the left camera 4L and the right camera 4R, namely, from the outputs of the left and right imaging devices 20, the difference in the coordinate value of the feature point between the left and right images provides the parallax δx. In this way, when the baseline length B, focal length f and parallax δx are obtained, the distance Zp from the cameras 4 (cameras serving as a reference) to the point of interest P can be calculated.

As was described in the foregoing, in the present embodiment, given an assumption of the distance between the cameras 4 and the object to be imaged (the package Ob) when the size measurement device 1 is actually in use, the surrounding regions A0, A1, A3 and A5 in the left image (200L) are made to correspond to the surrounding regions A0R, A1R, A3R and A5R in the right image (200R), respectively. In the following, the relationship between the surrounding regions in the left image and the surrounding regions in the right image will be explained quantitatively.

In the cameras 4L, 4R used in the present embodiment, the baseline length B and the focal length f are fixed values, and thus, if an amount of variation of Zp corresponding to the imaging range is determined, a range (amount of variation) of the parallax δx can be known. Thus, it can be presumed that the vertices P0, P1, P3 and P5 are respectively positioned within the surrounding regions A0R, A1R, A3R and A5R in the right image respectively corresponding to the aforementioned surrounding regions A0, A1, A3 and A5 in the left image serving as a reference, and accordingly, the range in which each vertex is searched for (surrounding region) can be narrowed and the processing load of the processes that follow, such as edge detection, can be reduced.

Specifically, in the present embodiment, in an exemplary case where the baseline length B is 75 mm, the focal length f is 6 mm and the cameras 4 each have an imaging device 20 having a pixel pitch of 0.003 mm, the parallax δx is 0.45 mm when the distance Zp is equal to 1 m and 0.225 mm when the distance Zp is equal to 2 m in accordance with the above Equation 3. As the pixel pitch is 0.003 mm, the range of the parallax δx can be expressed as 75 pixels<δx<150 pixels, and based on this range, the search range in the stereo matching can be defined as a narrow range. More specifically, the size (diameter) of the surrounding region displayed when the user designates a point in the left image by touching is set to be 150 pixels as expressed in pixels of the imaging sensor, and to define the corresponding surrounding region in the right image, the touched point in the left image is shifted to the left along the x-axis direction (in a negative direction when the direction indicated by the arrow in the coordinate system shown in FIG. 1 indicates a positive direction) by (75+150)/2=112 pixels to roughly set the center coordinate of the surrounding region. In this way, when the touched points are set by use of the left image, it is possible to set the surrounding regions in the right image taking into account the parallax. Thus, the user is only required to set the touched points in either of the left and right images to measure the package size.

In next step ST9, the parallax is obtained based on the coordinate of each vertex in the left and right images. As described above, adjustments have been made in the cameras 4L, 4R based on the result of calibration performed before shipping except for the x-axis shift direction, and thus, the difference in the x-coordinate between any of the corresponding vertices P0 and P0R, P1 and P1R, P3 and P3R, and P5 and P5R (the left one in each vertex pair is derived from the left image while the right one is derived from the right image) directly represents the parallax δx for the corresponding vertices.

However, in a case where the parallax δx is calculated directly from the coordinates of vertices obtained from the edge images, the result of calculation will be a discrete value expressed in pixels, because edge detection includes binarization. In a case where the number of pixels in the imaging sensor is sufficiently large and the parallax itself is large (for example, when the distance between the cameras and the object to be imaged is short), the effect is small. When this is not the case, however, it is possible to calculate the parallax δx in sub-pixels by performing a block matching process using the images (grayscale image, of course) in the corresponding surrounding regions in the left image and the right image, for example.

In step ST10, based on the parallax obtained in step ST9 for each vertex P0, P1, P3, P5, the three-dimensional coordinate of each vertex is calculated. It is to be noted that the distance Zp can be obtained from the aforementioned Equation 1. By thus obtaining the three-dimensional coordinate of each vertex P0, P1, P3, P5, it is possible to calculate the length of each of the three edges converging to the common vertex P0 (P0 to P1, P0 to P3, P0 to P5) and to obtain the size of the package Ob based thereon.

Next, a description will be made of a case where it is determined in above-described step ST6 in FIG. 4 that effective edge segments have not been detected in any of the four surrounding regions A0, A1, A3 and A5, namely, a branch process for exception handling, with reference to FIG. 9(a). It is to be noted that, as described already, an effectiveness of an edge segment can be determined by assessing the contrast difference between the edge segment and its surrounding region, etc.

Figure 10A:
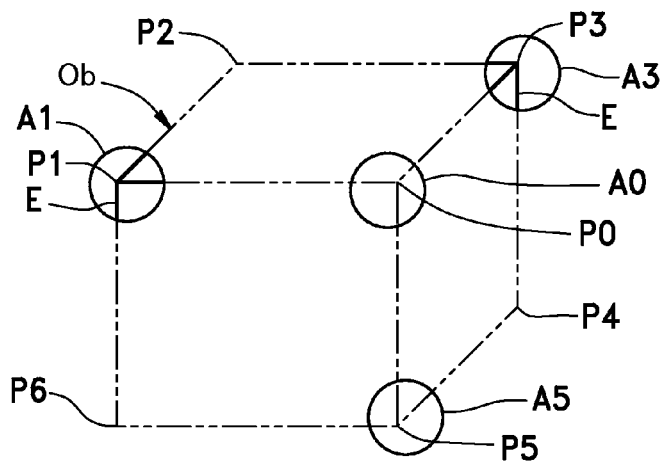
FIG. 10(a) is a diagram for explaining a case where no edge was detected in some of the surrounding regions.

In the following, a description will be given of an exemplary case where no edge segment was detected in some surrounding regions as illustrated in FIG. 10(a), where, specifically, edge segments were detected in the surrounding regions A1 and A3 but no edge segment was detected in the surrounding regions A0 and A5.

As described above, there are four surrounding regions generated based on the touched points. If it can be assumed that the surrounding regions include one common vertex defined by three edges constituting the package and the ends of the three edges opposite to the common vertex, it is possible to infer the positions of the surrounding regions (in this example, A2, A4 and A6) corresponding to the vertices (in this example, vertices P2, P4 and P6) which are actually not designated by touching, based on the positional relationship between the surrounding regions. This is because the package, which is an object to be measured, substantially has the shape of a rectangular parallelepiped.

Figure 10B:
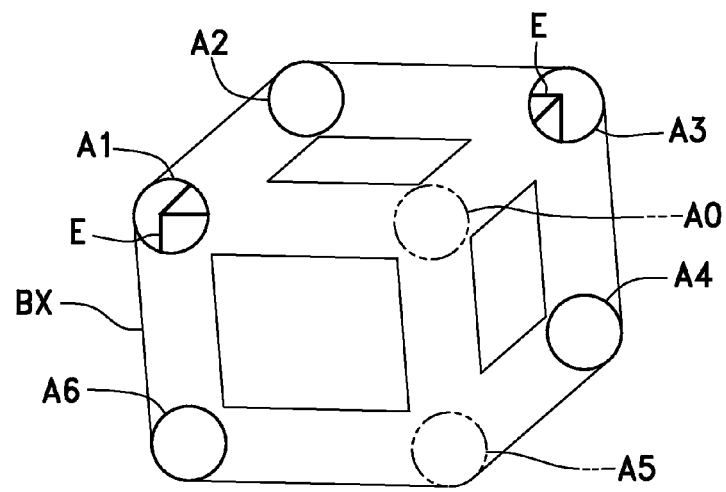
FIG. 10(b) is a diagram for explaining step ST12 in FIG. 9(a)

Specifically, in step ST12 of FIG. 9(a), as shown in FIG. 10(b), a virtual box-shaped object BX, which resembles a rectangular parallelepiped and is formed of edges each having a thickness (width) corresponding to the size (diameter) of the surrounding regions A0, A1, A3, A5 in accordance with the Y-shaped three edges (A0 to A1, A0 to A3, A0 to A5) converging to the surrounding region A0 as a common vertex, is set in the screen such that corners of the virtual box-shaped object BX coincide with the surrounding regions A1 and A3 in which edge segments E were detected. At this time, a fine adjustment for aligning the edge portions of the virtual box-shaped object BX with the detected edge segments E as guides may be performed. By superimposing the virtual box-shaped object BX as described above, the positions of the surrounding regions A2, A4, A6 which were not designated by touching are determined.

In next step ST13, edge detection is performed in each of the surrounding regions A2, A4 and A6 corresponding to the three vertices other than those corresponding to the four surrounding regions A0, A1, A3 and A5 generated in response to the designation using the stylus 14. In a case where an image of the package Ob having the shape of a rectangular parallelepiped is captured such that the image includes therein an arbitrary vertex (a vertex facing the cameras 4) and the three edges connected to the vertex, there will be seven vertices P0 to P6 in the image as shown in FIG. 5, which include the three vertices P2, P4 and P6 other than the vertices designated by the user with the stylus 14, and thus, the vertices P2, P4 and P6 can be positioned in the respective surrounding regions A2, A4 and A6 of the virtual box-shaped object BX. Therefore, when detecting the edges (edge segments) for obtaining the vertices P2, P4 and P6, image processing (edge processing, etc.) is required to be performed only in the limited ranges of the surrounding regions A2, A4 and A6 and there is no need to perform edge processing for the entire screen, whereby the image processing load can be reduced.

Figure 10C:
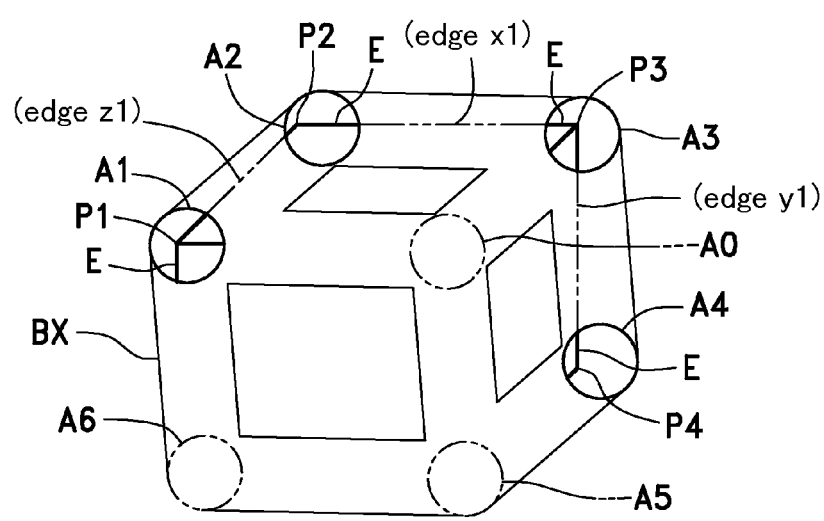
FIG. 10(c) is a diagram for explaining steps ST13 and ST14 in FIG. 9(a)

In next step ST14, if edge segments E were detected in two surrounding regions A2, A4 in step ST13 as shown in FIG. 10(c), for example, the edge segments E detected in the surrounding regions A2, A4 are adopted as being effective.

In next step ST15, it is determined whether all vertices that determine the three edges (edge x1, edge y1, edge z1) necessary for obtaining the size of the package Ob have been detected. In the illustrated example, the vertices P2 and P3 correspond to the edge x1, the vertices P3 and P4 correspond to the edge y1, and the vertices P1 and P2 correspond to the edge z1, all vertices P1 to P4 enabling extraction of the edges x1, y1, z1 necessary to obtain the size of the package Ob have been obtained. In this case, the flow proceeds to step ST8 (Yes in step ST15).

Figure 4:
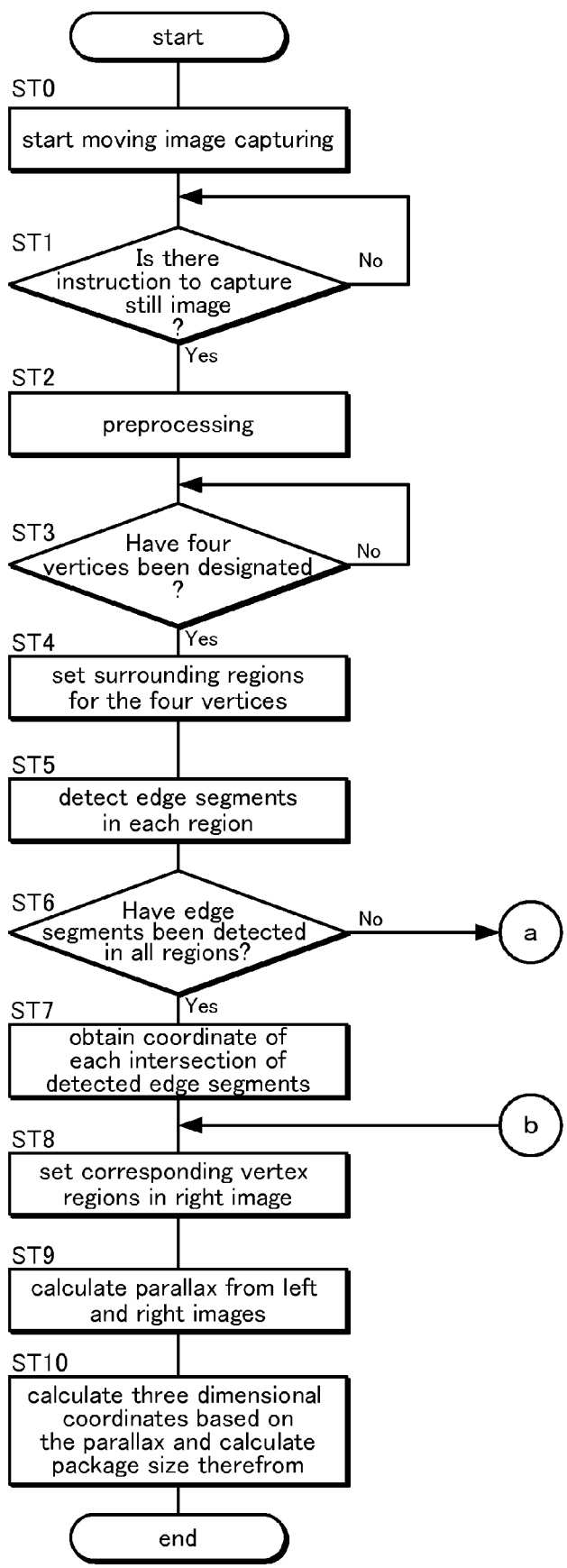
FIG. 4 is a flowchart showing a mode of control of the size measurement device.

In step ST8 and the following steps, the processes described with reference to FIG. 4 are performed to measure the size of the package Ob. In a case where it is determined in step ST15 that not all of the necessary vertices have been obtained (No in step ST15), the size of the package Ob cannot be measured, and thus, the flow proceeds to step ST16, where an error message is displayed on the display unit 7, for example, and the flow is terminated.

As described above, in the exception handling shown in the flow of FIG. 9(a), when the vertex position was not detected in any of the four surrounding regions (A0, A1, A3 and A5 in the present embodiment), the image processing unit 6 (see FIG. 2) infers, from the positional relationship between the four surrounding regions, other surrounding regions (A2, A4 and A6 in the present embodiment) which include therein the vertex positions that were not designated by the user, and obtains the vertex positions in the inferred surrounding regions.

Next, with reference to FIG. 9(b), a description will be given of another example of the branch process performed in the case where it is determined in aforementioned step ST6 in FIG. 4 that effective edge segments were not detected in any of the four surrounding regions A0, A1, A3 and A5.

Figure 11A:
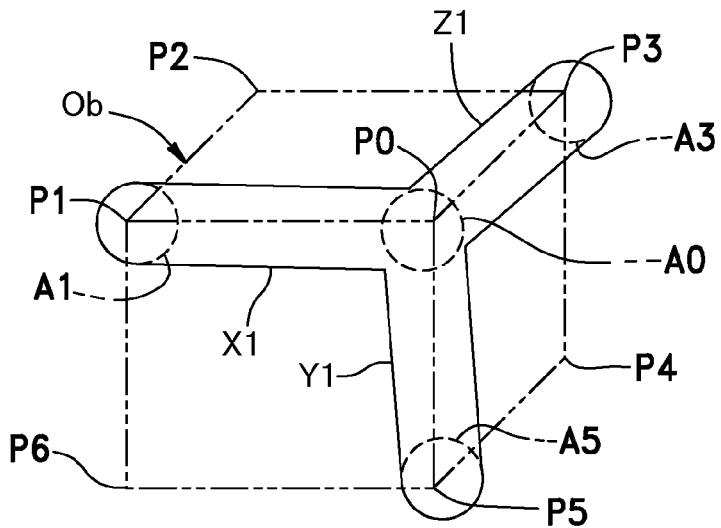
FIG. 11(a) is a diagram for explaining step ST17 in FIG. 9(b)

In step ST17 of FIG. 9(b), as shown in FIG. 11(a), by regarding the four surrounding regions A0, A1, A3 and A5 corresponding to the positions designated with the stylus 14 as large vertices, spaces X1, Y1 and Z1 (hereinafter referred to as edge regions) that connect the surrounding region A0 including therein the common vertex with the regions A1, A3 and A5, respectively, are set, each space having a width corresponding to the size of the surrounding region A0, A1, A3, A5 (diameter when the surrounding region is circular). As each surrounding region has an area, each edge region connecting the surrounding regions also has an area. Provided that each surrounding region includes a vertex therein, it is highly probable that an edge connecting two vertices is included in each edge region. Thus, edge detection is performed in each edge region X1, Y1, Z1 to extract an edge between the vertices (namely, equation of a line segment).

In this case, while the detection of a vertex in the surrounding region A0 (A1, A3, A5) is detection of a point, the detection of an edge in the edge region X1 (Y1, Z1) is detection of a line. The accuracy of detection of a vertex, which is theoretically a point, heavily depends on a local condition. In contrast, in the case of an edge, which is theoretically a line, even when there is a section(s) with a poor imaging condition, it is possible to infer the whole by connecting together the edge segments determined to be effective, and therefore, edge detection can be performed with a high probability, such that even under circumstances where the lighting condition is poor, the frequency of errors due to detection failure can be reduced.

Figure 11B:
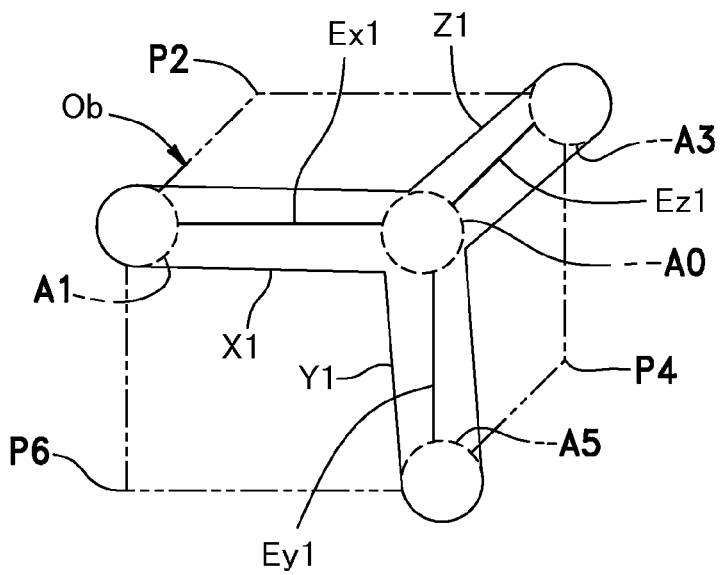
FIG. 11(b) is a diagram for explaining step ST18 in FIG. 9(b)
Figure 12A:
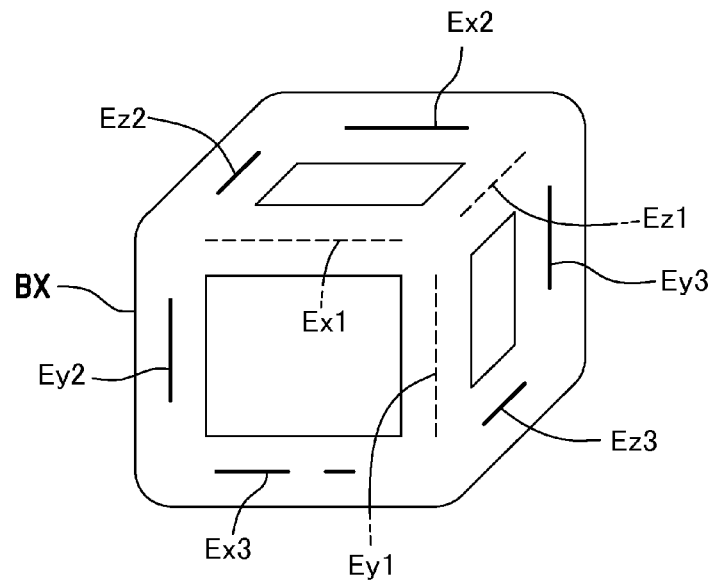
FIG. 12(a) is a diagram for explaining step ST19 in FIG. 9(b)

In next step ST18, in the same manner as in aforementioned step ST12, a virtual box-shaped object BX resembling a rectangular parallelepiped and formed of edges each having a thickness corresponding to the size of the surrounding regions (e.g., A0) is set in the screen in conformity with edge segments Ex1, Ey1 and Ez1 respectively detected in the edge regions X1, Y1 and Z1 shown in FIG. 11(b) (FIG. 12(a)).

The concept of setting the edge regions and conducting search only in the edge regions is significant to efficiently extract the edges connecting the vertices. On the other hand, in such a case where, of the four vertices necessary for size measurement, only one of the vertices other than the common vertex was not detected, it is only necessary theoretically to extract only two edges that are connected to this vertex, and thus, the processes in step ST18 (position adjustment of the virtual box-shaped object BX) and step ST19 (edge detection in the virtual box-shaped object BX) which will be described below may be omitted. For the same reason, aforementioned step ST12 in FIG. 9(a) may be omitted.

Further, since the purpose of edge detection is to extract at least two line segments constituted of edge segments and to obtain a vertex coordinate of the package Ob from the point of intersection (or smallest distance point) between the two line segments, at least three surrounding regions having edge regions therebetween (i.e., surrounding regions adjacent to each other) are necessary.

In next step ST19, as shown in FIG. 12(a), for example, edge detection is performed in each of the edge regions corresponding to the edges of the virtual box-shaped object BX set in step ST18. In this case also, the image processing (edge processing, etc.) needs to be performed only in a limited narrow regions, and thus, the processing load of the edge detection can be reduced.

In next step ST20, the line segments extracted in the edge regions of the virtual box-shaped object BX by the edge detection are extended, and each of the point(s) of intersection between the extension lines is determined to be a vertex (in the description below, the line segments or the extension lines may be referred to as edge segments without discrimination). The point of intersection is regarded as indicating the vertex position in each surrounding region in which the vertex position was not detected in the flow of FIG. 4. Namely, in the flow shown in FIG. 9(b), surrounding regions (area information) surrounding the touched points (point information) are obtained, edges (line information, namely, equations of straight lines in the space) are extracted from the edge regions connecting the surrounding regions, and the coordinate of a vertex or vertices (point information) is calculated by determining the point of intersection between two straight lines.

Figure 12B:
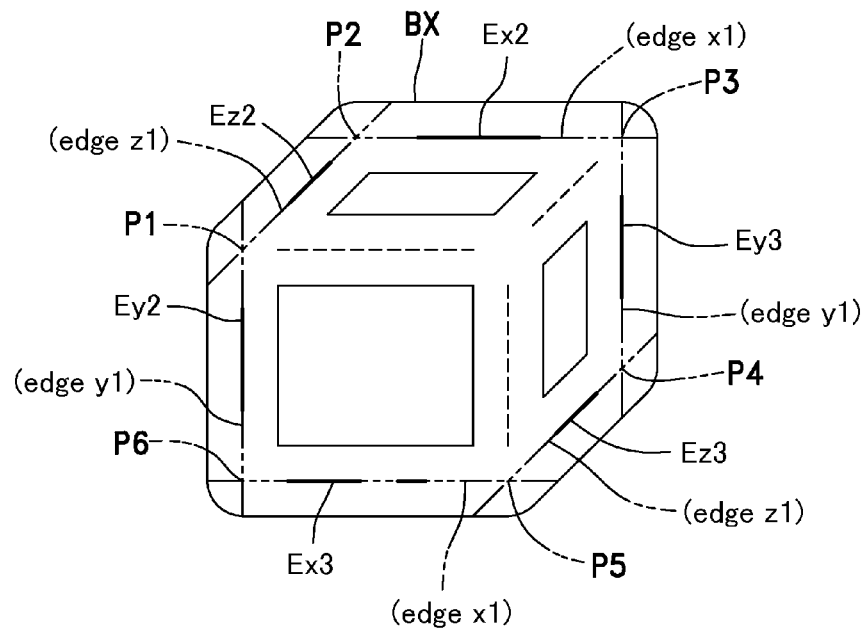
FIG. 12(b) is a diagram for explaining step ST20 in FIG. 9(b).

For example, in a case where edge segments Ex2, Ex3, Ey2, Ey3, Ez2 and Ez3 were detected as shown in FIG. 12(a), each of the edge segments Ex2, Ex3, Ey2, Ey3, Ez2 and Ez3 are extended in the edge regions of the virtual box-shaped object BX as indicated by long dashed double-short dashed lines in FIG. 12(b), so that the points of intersection between the edge segments Ex2, Ex3, Ey2, Ey3, Ez2 and Ez3 and their extension lines are determined to be vertices P1 to P6. Then, the flow proceeds to step ST15.

In this case, if the edge segment Ex2, Ex3, Ey2, Ey3, Ez2 and Ez3 are detected to be in a skewed relationship due to poor imaging conditions, no intersection between the edge segments and extension lines will be detected. In such a case, a coordinate (smallest distance point) of an intermediate position between the two edges in each surrounding region where the distance between the two edges becomes the smallest can be used as a vertex coordinate.

In step ST15, as described in the foregoing, it is determined whether the points determined to be vertices in step ST20 provide all vertices necessary to determine the three edges (edge x1, edge y1, edge z1) necessary for measurement of the size of the package Ob.

In the illustrated example, the edge segments Ex2, Ex3, Ey2, Ey3, Ez2 and Ez3 which correspond to the six edges of the virtual box-shaped object BX other than the Y-shaped three edges at the central portion thereof are all detected, and corresponding six vertices (P1 to P6) are obtained in step ST20. In this case, a segment between vertices P2 and P3 and a segment between vertices P5 and P6 each correspond to the edge x1, a segment between vertices P3 and P4 and a segment between vertices P1 and P6 each correspond to the edge y1, and a segment between vertices P1 and P2 and a segment between vertices P4 and P5 each correspond to the edge z1. Please note that it is not necessarily required that all six vertices P1 to P6 be obtained, and it is sufficient if the four vertices necessary to determine the three edges (edge x1, edge y1, edge z1) necessary for measurement of the size of the package Ob are obtained, as in the aforementioned case where the vertices P1 to P4 were obtained.

If it is determined in step ST15 that four necessary vertices have been obtained, the flow proceeds to step ST8, and in step ST8 and the following steps, the processes described with reference to FIG. 4 are performed to measure the size of the package Ob.

As described in the foregoing, in the present invention, it is only required to set regions corresponding to positions designated with the stylus 14 and to perform edge detection and a block matching process in the narrow regions defined around the designated positions, without need for performing the edge processing over the entirety of the screen or the entirety of the package Ob, whereby the image processing load can be reduced significantly. This also enables the size measurement process to be performed faster. The size of the surrounding regions is set taking into account the error range of the designation performed by use of the stylus 14, and even when no edge segment is detected in some regions due to an influence of lighting or the like, by setting edge regions or a virtual box-shaped object BX while taking the surrounding regions as large vertices, it becomes possible to detect edge segments corresponding to the respective edges, whereby the possibility of edge detection failure can be minimized. Further, the positions designated with the stylus 14 are not directly used as the vertices of the package Ob, but instead, regions are set in response to the designation and the vertices are obtained reliably based on the edge segments detected in the set regions and the lengths of the edges are calculated based thereon, and therefore, it is possible to remove the uncertainty relating to the designation by touching and to measure the package size with a high accuracy.

Further, it is not necessary to refer to the all edges in order to obtain the vertex coordinates. For example, edges determined to have a higher degree of reliability in the process of edge extraction may be used with a higher priority. The degree of reliability here can be calculated based on the length of a part of an edge for which edge detection was performed continuously, for example. For instance, compared with a case where an edge is detected as separated parts as indicated by the edge segment Ex3 in FIG. 12(a), the continuously detected edge segment Ex2 is considered to have a higher degree of reliability. Alternatively, it is also possible to calculate the degree of reliability based on the contrast information of a part around an edge segment detected as part of an edge. Comparison is made between the reliabilities of mutually parallel edges in each of the x-axis, y-axis and z-axis directions for the size measurement, so that the edge having the highest degree of reliability is used. For example, in aforementioned FIG. 12(a), if the edge segment Ex2 has the highest degree of reliability among the edge segments Ex1 to Ex3 extending in the x-axis direction, the edge segment Ex2 is used as the edge x1 in the x-axis direction in the detection of coordinates of the vertices. This is the same with the y-axis and the z-axis. This approach utilizes the fact that the object for which size measurement is to be performed is a special object, that is a box-shaped package Ob having the shape of a rectangular parallelepiped. Namely, as the package Ob has the shape of a rectangular parallelepiped, there are three parallel edges for an arbitrary edge of the package Ob (e.g., Ex1 to Ex3), and in the size measurement, any of the three parallel edges may be used in obtaining the coordinates of the vertices, though the edge having the highest degree of reliability can be preferably used. It is to be noted here that when a certain edge has a high degree of reliability, if the other edges intersecting this edge have a low degree of reliability, the accuracy of the detected vertex coordinates will be low, and thus, in actual processes, it is preferred to rank multiple parallel edges according to their degrees of reliability, so that when obtaining the vertex coordinates, an edge given a higher rank is used preferentially. It is to be noted that, in a strict sense, a part of the package more distant from the camera will appear smaller. However, by appropriately setting the distance to the package Ob and angle of view relative to the size of the package Ob, it is possible to approximately treat the shape of the package as being constituted of parallel edges.

As described in the foregoing, in the exception handling shown in the flowchart of FIG. 9(b), if a vertex position was not detected in any of the four surrounding regions (A0, A1, A3 and A5 in the illustrated embodiment), the image processing unit 6 (see FIG. 2) extracts, in the spaces between the surrounding region (e.g., A0) in which the vertex position was not detected and at least two other surrounding regions (e.g., A1 and A3) adjacent thereto (such spaces may be the edge region X1 between the regions A0 and A1 and the edge region Z1 between the regions A0 and A3, for example), at least two edges (e.g., the edge Ex1 between the regions A0 and A1 and the edge Ez1 between the regions A0 and A3), and treats the point of intersection or smallest distance point between the extracted two edges as a vertex position in the surrounding region (A0) in which the vertex position was not detected, and then, calculates the lengths of the edges of the package using this vertex position.

In the foregoing, with regard to the three-dimensional distance measurement of the embodiment, a detailed description was given taking a so-called stereo method as an example. However, in view of searching for vertices only in surrounding regions set in the vicinity of touched points, the present invention should not be limited to the stereo method, and may be combined with another distance measurement method. Known as such a distance measurement method are, for example: a method of capturing an image of an object to be measured together with a reference object whose size is known beforehand and inferring the size of the object to be measured based on the size of the reference object (reference label method); a method of projecting a sinusoidal grid pattern generated by a projection optical system while varying the phase thereof and capturing the image with a single camera multiple times to obtain a phase value from the change in brightness at a measurement point (sinusoidal pattern projection method); a method which is an improvement of the sinusoidal pattern projection method, in which sinusoidal fringe pattern lights whose phases are shifted relative to each other are projected onto an object to be measured, and a synthesized phase value is obtained from an image including moire (interference fringe projection imaging); a method of scanning/imaging an object to be measured multiple times with linear laser light and obtaining the distance to the measurement point based on a triangle uniquely defined by the baseline length, scanning angle and light incident angle (light-section method); and a method of measuring the period of time from when a laser pulse is emitted towards an object to be measured to when reflection light is detected and obtaining the distance to the object to be measured based on the light speed C (TOF).

For example, by performing three-dimensional distance measurement for each intersection in an imaging space divided into meshes by use of any of the above methods, while designating vertex coordinates of the package in an image obtained at substantially the same timing as the distance measurement, it is possible to calculate each vertex coordinate by performing interpolation using the mesh intersection coordinates. It is to be noted, however, that in the distance measurement methods other than the stereo method and the reference label method, the designation of the vertex coordinates and the actual distance measurement are performed at different timings, and thus, in view of the measurement accuracy, it is preferred to use the stereo method or the reference label method. In further view of versatility, it is preferred to use the stereo method which does not need a reference label.

In the foregoing, the present invention has been described in terms of the preferred embodiments thereof. However, as will be readily appreciated by a person having ordinary skill in the art, the present invention is not limited to these embodiments, and may be altered as appropriate without departing from the spirit of the present invention. Further, though the above description was made of an example in which the object to be imaged is a package and four feature points are obtained, the present invention of course can be utilized in a case where the user measures the distance between arbitrary two points of the object. Further, not all of the structural elements shown in the above embodiments are necessarily indispensable, and they may be selectively used as appropriate without departing from the spirit of the present invention.

INDUSTRIAL APPLICABILITY

The size measurement device according to the present invention is capable of measuring the package size accurately with a simple structure, and thus, can be preferably adopted in a handy terminal or the like used for logistics management in transportation business or the like.

GLOSSARY 1 size measurement device
4 camera
6 image processing unit
7 display unit
7a touch panel
9 overall control unit
10 input unit
12 size measurement terminal
13 control device
20 imaging sensor
21 imaging optical system
Ob package

The invention claimed is:

1. A size measurement device for measuring a size of an object, the object being a package, having a shape of a rectangular parallelepiped, and being from a captured image of the object, the size measurement device comprising:
   a camera;
   a display;
   an input for inputting instructions of a user;
   a processor; and
   a memory including instructions that, when executed by the processor, cause the processor to perform operations including:
      capturing an image of the object by the camera;
      displaying image data of the image captured by the camera;
      setting, when four positions are designated with an input in the image data displayed on the display, four detecting regions including the four designated positions, the four designated positions including a vertex to which three edges of the package converge and end points of the three edges which converge to the vertex, the endpoints of the three edges being opposite to the vertex;
      detecting, for each of the four detecting regions, edge segments corresponding to at least two edges that converge to a cross-point inside a corresponding detecting region; and
      determining, based on the edge segments and the cross-point of each of the four detecting regions, vertex points providing coordinates of the object to be measured.

2. The size measurement device according to claim 1, the operations further including:
   calculating a distance between two vertex points based on the image data when the two vertex points are determined to be in at least two of the four detecting regions.

3. The size measurement device according to claim 1, wherein the four detecting regions are displayed on the display.

4. The size measurement device according to claim 1, wherein each of the four detecting regions is circular in shape.

5. The size measurement device according to claim 1, wherein each of the four detecting regions is rectangular in shape.

6. The size measurement device according to claim 1, wherein the camera comprises a first camera and a second camera which are positioned to be spaced apart by a predetermined distance to capture images of the object from different installed positions simultaneously, and the operations further include:
   calculating a distance between the vertex points by performing arithmetic processing based on information on parallax between the first camera and the second camera.

7. The size measurement device according to claim 1, wherein the input and the display are constituted of a touch panel.

8. The size measurement device according to claim 1, the operations further including:
   calculating lengths of edges of the package based on positions of the vertex points when four vertex points are determined.

9. The size measurement device according to claim 1, wherein in a case where a vertex point is not detected in any of the four detecting regions set for the four designated positions, the operations further include:
   inferring, based on positional relationships between the four detecting regions, other detecting regions including positions not designated by the user, and obtaining the vertex points in the inferred other detecting regions.

10. The size measurement device according to claim 1, wherein in a case where a vertex point is not detected in any of the four detecting regions, the operations further include:
    extracting at least two edges in spaces between a detecting region in which the vertex point is not detected and at least two other of the four detecting regions adjoining, the detecting region; and
    regarding a point of intersection or a smallest distance point between the extracted two edges as a vertex point corresponding to the detecting region in which the vertex point is not detected.

11. The size measurement device according to claim 1, the operations further including:
    when determining the vertex points, matching edge images, created by tracing the edge segments inside of the each of the four detecting regions, with a pattern of edges between the edges inside of each of the four detecting regions based on positional relationships between the four designated positions.

12. A size measurement method for measuring a size of an object from a captured image of the object, the size measurement method comprising:
    capturing an image of a package having a shape of a rectangular parallelepiped as the object;
    displaying image data of the image;
    setting, when a user designates four positions in the image data, four detecting regions including the four designated positions, the four positions including a vertex to which three edges of the package converge and end points of the three edges which converge to the vertex, the endpoints of the three edges being opposite to the vertex;
    detecting, for each of the four detecting regions, edge segments corresponding to at least two edges that converge to a cross-point inside a corresponding detecting region; and determining, based on the edge segments and the cross-point of each of the four detecting regions, vertex points providing coordinates of the object to be measured.

* * * * *